US012430516B2

United States Patent
Lei et al.

(10) Patent No.: US 12,430,516 B2
(45) Date of Patent: Sep. 30, 2025

(54) METHOD OF TRAINING DIALOG GENERATION MODEL FOR RECOMMENDATIONS, METHOD OF GENERATING RECOMMENDATIONS, AND DEVICE

(71) Applicant: Beijing Baidu Netcom Science Technology Co., Ltd., Beijing (CN)

(72) Inventors: Zeyang Lei, Beijing (CN); Xinchao Xu, Beijing (CN); Wenquan Wu, Beijing (CN); Zhengyu Niu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 323 days.

(21) Appl. No.: 18/056,137

(22) Filed: Nov. 16, 2022

(65) Prior Publication Data

US 2023/0075339 A1 Mar. 9, 2023

(30) Foreign Application Priority Data

Feb. 21, 2022 (CN) .......................... 202210159291.3

(51) Int. Cl.
*G06F 40/40* (2020.01)
*G06F 40/284* (2020.01)

(52) U.S. Cl.
CPC ............ *G06F 40/40* (2020.01); *G06F 40/284* (2020.01)

(58) Field of Classification Search
CPC ........ G06F 40/40; G06F 40/284; G06F 40/56; G06F 40/35; G06F 16/3329;
(Continued)

(56) References Cited

U.S. PATENT DOCUMENTS

2021/0027018 A1* 1/2021 Lin .................... G06N 3/088

FOREIGN PATENT DOCUMENTS

| CN | 109992764 | 7/2019 |
| CN | 110427617 | 11/2019 |

(Continued)

OTHER PUBLICATIONS

Siqi Bao, Huang He, Fan Wang, Hua Wu and Haifeng Wang, "PLATO: Pre-trained Dialogue Generation Model with Discrete Latent Variable" arXiv: 1910.07931v3 [cs.CL] Apr. 30, 2020 (Year: 2020).*

(Continued)

*Primary Examiner* — Paras D Shah
*Assistant Examiner* — Mulugeta Tuji Dugda
(74) *Attorney, Agent, or Firm* — HSML P.C.

(57) ABSTRACT

The present disclosure provides a method of training an information generation model, a method of generating an information, an electronic device, and a storage medium. A specific implementation solution of the method of training the information generation model includes: splitting a description information for a target object in an information pair into at least one description word, so as to obtain a description word sequence, wherein the information pair further includes a first recommendation information; inputting the description word sequence into a dialog generation model to obtain a probability vector sequence for the target object, wherein each probability vector in the probability vector sequence includes probability values for a plurality of predetermined words; and training the dialog generation model according to the probability vector sequence and the first recommendation information, so as to obtain the information generation model.

13 Claims, 6 Drawing Sheets

(58) Field of Classification Search
CPC ...... G06F 40/242; G06F 40/289; G06F 40/30; G06N 3/044; G06N 3/045; G06N 3/084
See application file for complete search history.

(56) References Cited

FOREIGN PATENT DOCUMENTS

| | | | | | |
|---|---|---|---|---|---|
| CN | 110737769 | | 1/2020 | | |
| CN | 111177348 | A * | 5/2020 | ......... | G06F 16/3329 |
| CN | 111460109 | | 7/2020 | | |
| CN | 112667800 | | 4/2021 | | |
| CN | 112883179 | A * | 6/2021 | ......... | G06F 16/3329 |
| CN | 113641807 | | 11/2021 | | |
| CN | 13850386 | | 12/2021 | | |
| CN | 113761174 | | 12/2021 | | |
| CN | 114444510 | A * | 5/2022 | ............. | G06F 40/30 |
| WO | WO 2022041979 | A * | 3/2022 | ........... | G06F 16/953 |

OTHER PUBLICATIONS

Chinese Office Action, issued in the corresponding Chinese patent application No. Chinese 202210159291.3, dated Oct. 12, 2022, 12 pages.

Bao et al., "PLATO-2: Towards Building an Open-Domain Chatbot via Curriculum Learning", Findings of the Association for Computational Linguistics, 2021 Association for Computational Linguistics, Aug. 2021, pp. 2513-2525.

Japanese Office Action, issued in the corresponding Japanese Application No. 2022-182720, dated Dec. 19, 2023, 10 pages.

* cited by examiner

METHOD OF TRAINING DIALOG GENERATION MODEL FOR RECOMMENDATIONS, METHOD OF GENERATING RECOMMENDATIONS, AND DEVICE

CROSS-REFERENCE TO RELATED APPLICATION(S)

This application claims the priority of Chinese Patent Application No. 202210159291.3, filed on Feb. 21, 2022, the entire contents of which are hereby incorporated by reference.

TECHNICAL FIELD

The present disclosure relates to a field of artificial intelligence, in particular to fields of natural language processing and deep learning technologies. More specifically, the present disclosure relates to a method of training an information generation model, a method of generating an information, an electronic device, and a storage medium.

BACKGROUND

With a development of a computer technology and a network technology, a method of generating an information through a natural language processing technology has become popular. In order to facilitate a promotion of the information, it is necessary to consider a consistency and a non-repetition of the information.

SUMMARY

The present disclosure aims to provide a method of training an information generation model, a method of generating an information, an electronic device, and a storage medium that may improve a diversity of a generated information.

According to an aspect of the present disclosure, a method of training an information generation model is provided, including: splitting a description information for a target object in an information pair into at least one description word, so as to obtain a description word sequence, wherein the information pair further includes a first recommendation information; inputting the description word sequence into a dialog generation model to obtain a probability vector sequence for the target object, wherein each probability vector in the probability vector sequence includes probability values for a plurality of predetermined words; and training the dialog generation model according to the probability vector sequence and the first recommendation information, so as to obtain the information generation model.

According to another aspect of the present disclosure, a method of generating an information is provided, including: splitting a description information for an object to be recommended into at least one description word, so as to obtain a description word sequence; inputting the description word sequence into an information generation model to obtain a probability vector sequence for the object to be recommended, wherein each probability vector in the probability vector sequence includes probability values for a plurality of predetermined words; and determining a recommendation information for the object to be recommended, according to the probability vector sequence, wherein the information generation model is trained using the method of training the information generation model provided by the present disclosure.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of training the information generation model and/or the method of generating the information provided by the present disclosure.

According to another aspect of the present disclosure, a non-transitory computer-readable storage medium having computer instructions therein is provided, and the computer instructions are configured to cause a computer to implement the method of training the information generation model and/or the method of generating the information provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

The present disclosure provides a method of training an information generation model, which includes a splitting stage, a sequence obtaining stage, and a training stage. In the splitting stage, a description information for a target object in an information pair is split into at least one description word, so as to obtain a description word sequence. The information pair further includes a first recommendation information. In the sequence obtaining stage, the description word sequence is input into a dialog generation model to obtain a probability vector sequence for the target object. Each probability vector in the probability vector sequence includes probability values for a plurality of predetermined words. In the training stage, the dialog generation model is trained according to the probability vector sequence and the first recommendation information, so as to obtain the information generation model.

An application scenario of the method and the apparatus provided in the present disclosure will be described below with reference to FIG. 1.

Figure 1:
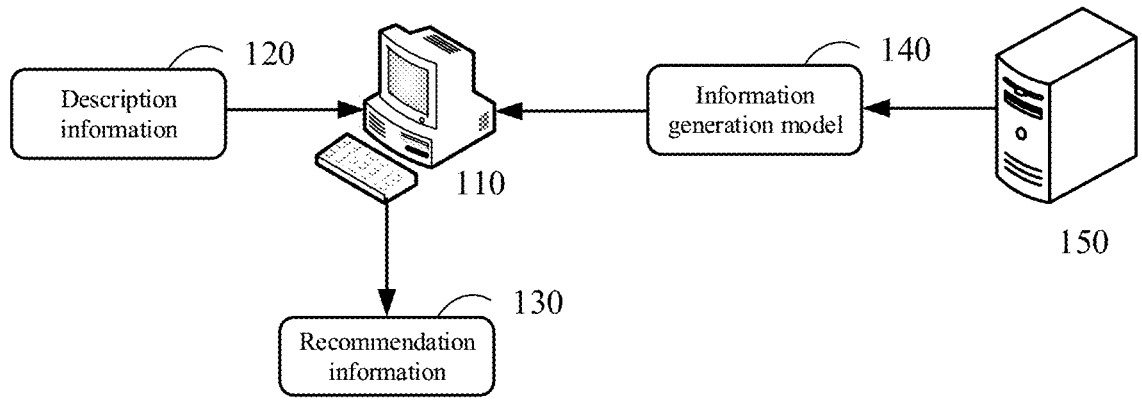
FIG. 1 shows a schematic diagram of an application scenario of a method and an apparatus of training an information generation model and a method and an apparatus of generating an information according to embodiments of the present disclosure.

FIG. 1 shows a schematic diagram of an application scenario of a method and an apparatus of training an information generation model and a method and an apparatus of generating an information according to embodiments of the present disclosure.

As shown in FIG. 1, an application scenario 100 of such embodiments may include an electronic device 110, which may be various electronic devices with processing functions, including but not limited to smart phones, tablet computers, laptop computers, desktop computers, servers, and so on.

According to embodiments of the present disclosure, the electronic device 110 may provide, for example, a human-computer interaction interface to obtain a description information 120 through a user operation. The description information 120 may be, for example, for an item to be promoted. The electronic device 110 may generate, for example, a recommendation information 130 for the item to be promoted, according to the obtained description information 120.

Exemplarily, the electronic device 110 may extract a keyword or a key segment from the description information 120, for example, by using a text summary extraction technology, and arrange and combine the extracted keyword or key segment, so as to obtain the recommendation information 130.

Exemplarily, the electronic device may also adopt an end-to-end information generation model. The description information 120 may be input into the information generation model, and the recommendation information 130 may be output from the information generation model. The end-to-end information generation model may be trained using collected advertising corpus. The information generation model may adopt a recurrent neural network (RNN), specifically, a bi-directional recurrent neural network (BiRNN), a gated recurrent unit (GRU), and a long short-term memory (LSTM). Alternatively, the information generation model may also adopt a Transformer model or the like.

According to embodiments of the present disclosure, as shown in FIG. 1, the application scenario 100 may further include a server 150. The server 150 may train the information generation model according to the corpus, and transmit a trained information generation model 140 to the electronic device 110 in response to an acquisition request sent by the electronic device 110, so that the electronic device 110 may generate, by using the information generation model 140, a recommendation information for the item to be promoted. It may be understood that the electronic device 110 may transmit the obtained description information 120 to the server 150, and the server 150 may generate the recommendation information for the item to be promoted by using the information generation model 140.

It may be understood that the electronic device 110 may be communicatively connected to the server 150 through a network, which may be a wired or wireless communication link. The server 150 may be a server providing various services, such as a background management server (for example only) that may provide a support for the human-computer interaction interface running on the electronic device 110. The server 150 may also be a server of a distributed system or a server combined with a block-chain.

It should be noted that the method of generating the information provided in the present disclosure may be performed by the electronic device 110 or by the server 150. Accordingly, the apparatus of generating the information provided in the present disclosure may be provided in the electronic device 110 or in the server 150. The method of training the information generation model provided in the present disclosure may be performed by the server 150. Accordingly, the apparatus of training the information generation model provided in the present disclosure may be provided in the server 150.

It should be understood that the number and type of the electronic device 110 and the server 150 shown in FIG. 1 are merely schematic. According to implementation needs, any number and type of electronic devices 110 and servers 150 may be provided.

The method of training the information generation model provided in the present disclosure will be described below in detail with reference to FIG. 2 to FIG. 5 in combination with FIG. 1.

Figure 2:
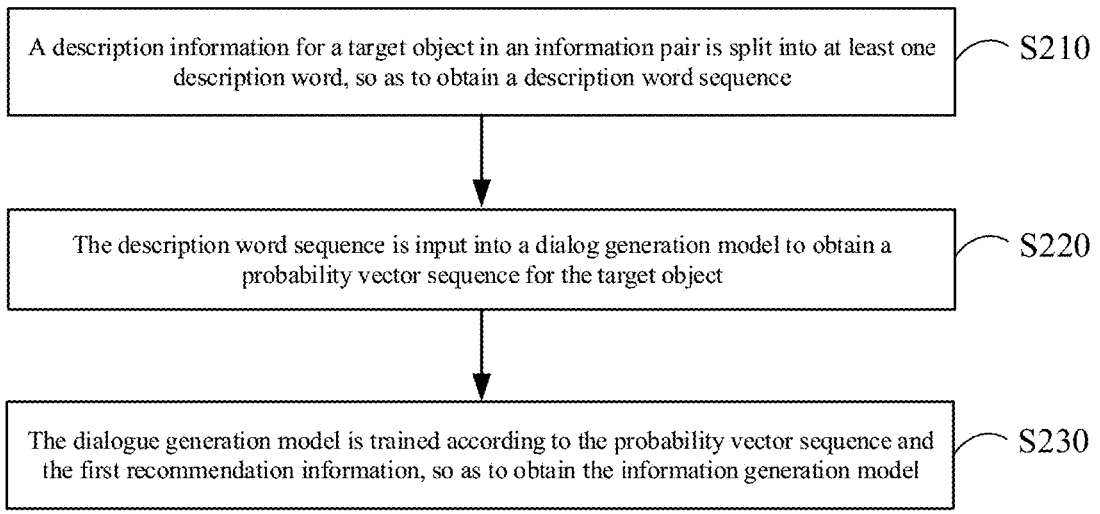
FIG. 2 shows a flowchart of a method of training an information generation model according to embodiments of the present disclosure.

FIG. 2 shows a flowchart of a method of training an information generation model according to embodiments of the present disclosure.

As shown in FIG. 2, a method 200 of training an information generation model in such embodiments may include operation S210 to operation S230.

In operation S210, a description information for a target object in an information pair is split into at least one description word, so as to obtain a description word sequence.

According to embodiments of the present disclosure, the information pair may include the description information and a recommendation information. For example, the description information and the recommendation information may be for a same target object, then the information pair may be used as a positive sample. For example, the description information and the recommendation information may be for different target objects, then the information pair may be used as a negative sample. For example, a plurality of information pairs may be provided, and the plurality of information pairs may include both positive samples and negative samples. The target object may be, for example, any promoted item such as clothing, food or furniture.

According to embodiments of the present disclosure, the description information may be split using a tokenization tool, so as to obtain the description word sequence. The tokenization tool may be a Jieba tokenization tool, a Jiagu tokenization tool, or an NLPIR tokenization tool, which is not limited in the present disclosure. For example, if the description information is "children's down jacket", a word sequence including a word "children" and words "down jacket" may be obtained by tokenization, and the word sequence is the description word sequence.

It may be understood that the first recommendation information may be a recommendation information for a promoted target object, or a recommendation information set manually, etc. The first recommendation information may specifically be a recommendation advertisement for a promoted target object, which is not limited in the present disclosure.

In operation S220, the description word sequence is input into a dialog generation model to obtain a probability vector sequence for the target object.

According to embodiments of the present disclosure, the dialog generation model may include, for example, an encoding network and a decoding network. The encoding network and the decoding network may be selected from a convolutional neural network (CNN), RNN, or a self-attention network. RNN may include BiRNN, GRU or LSTM. In such embodiments, the description word sequence may be directly input into the dialog generation model, and the dialog generation model may output the probability vector sequence. Alternatively, in such embodiments, an embedded representation may be firstly performed on each word in the description word sequence, so as to obtain a word feature vector representing each word. The word feature vector may be used as a token representing the word, and then a token sequence may be obtained by performing the embedded representation on the description word sequence. The probability vector sequence may be obtained by inputting the token sequence into the dialog generation model. It should be noted that each probability vector in the probability vector sequence is output in sequence, and a plurality of tokens in the token sequence may be input into the dialog generation model at the same time.

In an embodiment, the dialogue generation model may include a pre-trained dialogue generation model with a discrete latent variable, so that a "one-to-many" relationship in a dialogue may be effectively modeled, and a diversity of a generated recommendation information may be improved. The pre-trained dialogue generation model with the discrete latent variable may be a "PLATO" series model, such as a PLATO-2 model, which is not limited in the present disclosure.

According to embodiments of the present disclosure, the probability vector sequence obtained may include a plurality of probability vectors, and each probability vector may include probability values for a plurality of predetermined words. Each probability vector may be a token representing a recommendation word, and the plurality of predetermined words may be words included in a predefined dictionary.

In operation S230, the dialogue generation model is trained according to the probability vector sequence and the first recommendation information, so as to obtain the information generation model.

According to embodiments of the present disclosure, the first recommendation information may be split into at least one recommendation word to obtain a recommendation word sequence. Then, the embedded representation of each recommendation word in the recommendation word sequence may be obtained according to the predefined dictionary, so as to obtain the word vector representing each recommendation word. In this way, the recommendation word sequence may be converted into a word vector sequence. In such embodiments, a loss of the dialogue generation model may be determined according to a distance between each word vector in the word vector sequence and a probability vector corresponding to each word vector in the probability vector sequence. By adjusting a network parameter of the dialog generation model using a back propagation algorithm, the loss of the dialog generation model may be minimized, so that the dialog generation model meets a predetermined convergence condition. In such embodiments, the dialog generation model that meets the predetermined convergence condition may be used as the information generation model.

In an embodiment, the dialog generation model may be trained by maximizing a generation probability of the first recommendation information. For example, when at least one recommendation word is obtained, it is possible to determine a probability value $P(y_t|x, y_{<t})$ in a $t^{th}$ probability vector in the probability vector sequence for a $t^{th}$ recommendation word y in the at least one recommendation word. Assumed that a number of the recommendation word is T and a number of the probability vectors in the probability vector sequence is also T, the loss of the dialog generation model may be determined using Negative Log-Likelihood loss (NLL loss). Specifically, A loss $L_{NLL}$ of the dialog generation model may be calculated using Equation (1).

$$L_{NLL} = \Sigma_{(x,y) \in S, t=1}^{T} -\log P(y_t|x, y_{<t}) \quad (1)$$

where S represents a set of training samples, $y_{<t}$ represents an information output by the dialog generation model before outputting the $t^{th}$ probability vector, and x represents an input information of the dialog generation model.

According to the method of training the information generation model in embodiments of the present disclosure, the information generation model for generating the recommendation information may be obtained by training the dialogue generation model, so that the corpus for training to obtain the information generation model may be effectively increased, the diversity and coherence of the recommendation information obtained by using the information generation model may be improved, a case that the generated recommendation information does not conform to common sense and the marketing taste is too heavy may be avoided to some extent, and an effectiveness of an object promotion may be improved. For example, the dialogue generation model used in such embodiments may be a model pre-trained using a natural dialogue corpus, so that the recommendation generation model obtained may learn rich common sense knowledge.

In an embodiment, when training the dialog generation model, the dialog generation model may be pre-trained using massive natural dialog data. The pre-training principle is similar to an implementation principle of the aforementioned method 200, which will not be repeated here. In such embodiments, after the pre-training, the pre-trained dialogue generation model may be trained using question-and-answer corpus in the field of information recommendation as training data, so that the dialogue generation model may be transferred from a natural domain to a recommendation domain. Accordingly, the dialogue generation model in operation S220 may be a dialogue generation model obtained by pre-training and then training with question-and-answer corpus in the field of information recommendation.

Figure 3:
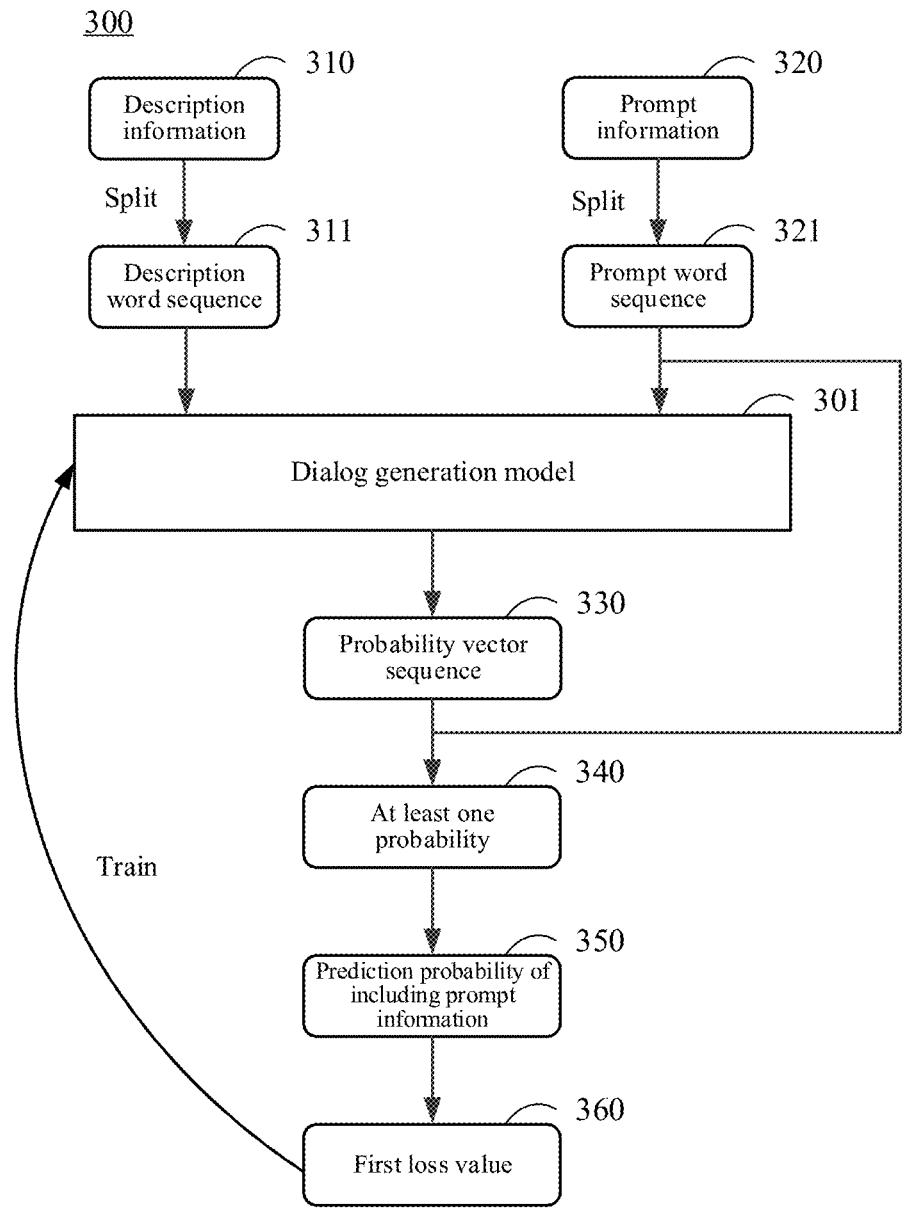
FIG. 3 shows a schematic diagram of a principle of a method of training an information generation model according to embodiments of the present disclosure.

FIG. 3 shows a schematic diagram of a principle of a method of training an information generation model according to embodiments of the present disclosure.

According to embodiments of the present disclosure, a prompt information may be provided for the information generation model, so that the generated recommendation information may be more in line with actual needs and better reflect a highlight of the item to be promoted. The prompt information and the above-mentioned description information may be provided, for example, by a manufacturer or a seller of the target object.

Specifically, as shown in FIG. 3, in an embodiment 300, after a description information 310 and a prompt information 320 are obtained through the human-computer interaction interface, the description information 310 may be split into at least one description word by using the above-mentioned tokenization tool, so as to obtain a description word sequence 311, and the prompt information 320 may be split into at least one prompt word to obtain a prompt word sequence 321. Then, the description word sequence 311 and the prompt word sequence 321 may be input into a dialog generation model 301, and the dialog generation model 301 outputs a probability vector sequence. For example, if the description information is "children's down jacket", the prompt information may be "leisure warm, free shipping". Accordingly, the prompt word sequence 321 may be a word sequence including a word "leisure", a word "warm" and words "free shipping".

According to embodiments of the present disclosure, when the probability vector sequence 330 is obtained, a prediction probability that a second recommendation information includes the prompt information 320 may be determined according to the probability vector sequence 330. With the second recommendation information including the prompt information 320 as a training target, the dialogue generation model is trained according to the prediction probability that the second recommendation information includes the prompt information 320. In this way, the probability that the generated recommendation information includes the prompt information may be increased, so that the generated recommendation information is more in line with actual needs.

In an embodiment, the second recommendation information may be determined firstly according to the probability vector sequence 330. Specifically, for each probability vector, it is possible to determine a predetermined word corresponding to a maximum probability value in the probability vector, so as to obtain a prediction word. A plurality of prediction words obtained are sorted according to a position of the probability vector in the probability vector sequence 330, and the plurality of prediction words are combined to form the second recommendation information. Then, the second recommendation information may be queried using each word in the prompt word sequence, so as to determine whether the word is contained in the second recommendation information or not. A proportion of the words in the prompt word sequence contained in the second recommendation information may be determined as the prediction probability that the second recommendation information includes the prompt information.

For example, if a plurality of prediction words obtained by sorting include a word "this", a word "children", a word "down jacket", a word "comfortable", a word "warm", a word "A", a word "region", and a word "free shipping", the second recommendation information may be "this children's down jacket, comfortable and warm, free shipping for region A".

In an embodiment, for each prompt word in the prompt word sequence 321, a probability that the second recommendation information contains the prompt word may be determined according to a probability value for the prompt word in all probability vectors in the probability vector sequence. Specifically, at least one probability value for the prompt word may be obtained according to all probability vectors. In such embodiments, an average value or a minimum value of the at least one probability value may be used as the probability that the second recommendation information contains the prompt word. For at least one prompt word included in the prompt word sequence 321, at least one probability 340 that the second recommendation information contains the at least one prompt word may be obtained. In such embodiments, a prediction probability 350 that the second recommendation information contains the prompt information 320 may be obtained according to the at least one probability 340. For example, a sum of the at least one probability 340 may be determined as the prediction probability 350.

When the prediction probability 350 that the second recommendation information contains the prompt information is obtained, in such embodiments, a first loss value 360 of the dialog generation model 301 may be determined according to the first probability. The dialogue generation model 301 is then trained according to the first loss value 360. For example, the first loss value 360 may be determined using a predetermined loss function. An independent variable in the predetermined loss function is the prediction probability 350, a dependent variable in the predetermined loss function is the first loss value 360, and the first loss value 360 is negatively correlated with the prediction probability 350, so as to achieve a training goal that the second recommendation information includes the prompt information 320.

In an embodiment, the predetermined loss function for determining the first loss value 360 may be expressed by Equation (2).

$$L_k = \Sigma_{j=1}^{N} \min_{i=1}^{T}(-\log p_i(k_j|x, y_{<t})) \qquad (2)$$

where $k_j$ represents a $j^{th}$ prompt word in at least one prompt word, $p_i(k_j|x, y_{<t})$ represents a probability value for the $j^{th}$ prompt word in an $i^{th}$ probability vector in the probability vector sequence, N is a total number of the at least one prompt word, T is a total number of the probability vectors included in the probability vector sequence, and $L_k$ represents the first loss value.

By inputting the prompt information into the dialogue generation model and training the dialogue generation model according to the prediction probability that the second recommendation information includes the prompt information, embodiments of the present disclosure may achieve an effect that a word generated by the dialogue generation model is controllable to a certain extent. In this way, when the information generation model obtained by training is used to generate a recommendation information, the recommendation information may include an expected prompt information.

Figure 4:
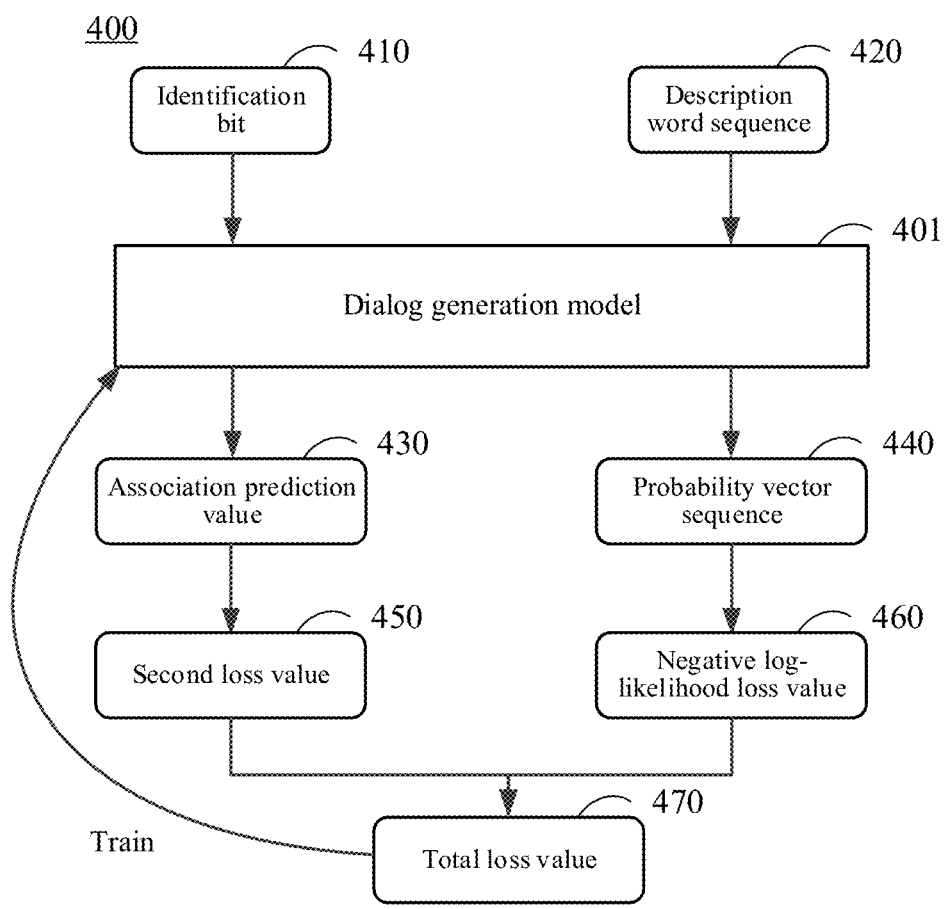
FIG. 4 shows a schematic diagram of a principle of a method of training an information generation model according to other embodiments of the present disclosure.

FIG. 4 shows a schematic diagram of a principle of a method of training an information generation model according to other embodiments of the present disclosure.

According to embodiments of the present disclosure, the dialog generation model may be trained according to an association relationship between the second recommendation information and the description information indicated by the probability vector sequence, so that a topic of the second recommendation information is closer to a topic described by the description information, and an accuracy of the recommendation information generated using the information generation model obtained by training may be improved to a certain extent.

In an embodiment, the second recommendation information may be determined according to the probability vector sequence by using the method described above. Then, the association relationship between the second recommendation information and the description information may be determined, and a second loss value of the dialog generation model may be determined according to the association relationship. Finally, the dialog generation model may be trained according to the second loss value.

For example, the association relationship may be represented by a semantic similarity between the second recommendation information and the description information. For example, a semantic feature of the second recommendation information and a semantic feature of the description information may be extracted using a semantic feature extraction model, and a similarity between the two semantic features may be determined as the semantic similarity. The semantic feature extraction model may adopt an LSTM model, etc., which is not limited in the present disclosure. Alternatively, the association relationship may be represented by a topic similarity between the second recommendation information and the description information. A topic of the second recommendation information and a topic of the description information may be extracted using a topic extraction model, and a similarity between the two topics may be determined as the topic similarity. The topic extraction model may adopt a Latent Dirichlet Allocation (LDA) model, etc., which is not limited in the present disclosure. Accordingly, in such embodiments, the second loss value may be determined using a predetermined loss function negatively correlated to the semantic similarity or the topic similarity.

In an embodiment, the dialogue generation model may adopt a pre-trained dialogue generation model with a discrete latent variable. As shown in FIG. 4, in an embodiment 400, an auxiliary task may be added to the dialog generation model, so that the dialog generation model may perform multi-task learning. Specifically, an identification bit 410 may be added to an input of the dialog generation model, that is, a token may be added. The identification bit 410 may use any random identification information. It may be understood that a function of the identification bit is similar to that of a latent variable bit input into the above-mentioned PLATO-2 model, which will not be described in detail in the present disclosure. In such embodiments, when training the dialog generation model 401, a random identification information used by the identification bit 410 and the description word sequence 420 may be input into the dialog generation model 401, and the dialog generation model outputs an association prediction value 430 corresponding to the random identification information and the probability vector sequence 440. The association prediction value 430 may be used to indicate the association relationship between the second recommendation information and the description information.

In such embodiments, the dialog generation model may be trained with a goal of maximizing the association prediction value. That is, the second loss is negatively correlated with the association prediction value. For example, the second loss value 450 may be determined firstly using a predetermined loss function according to the association prediction value 430, and then the dialogue generation model 401 may be trained with a goal of minimizing the second loss value 450. Moreover, in such embodiments, a negative log-likelihood loss value 460 may be determined according to the probability vector sequence 440 by using Equation (1). A total loss value 470 may be determined using a weighted sum of the second loss value 450 and the negative log-likelihood loss value 460, and the dialog to generate the model 401 may be trained according to the total loss value.

For example, the predetermined loss function for determining the second loss value 450 may adopt a cross entropy loss function, which is not limited in the present disclosure.

In an embodiment, while considering the second loss value 450, the above-mentioned first loss value may also be considered. Accordingly, the input to the dialog generation model includes not only the random identification information and the description word sequence, but also the prompt word sequence. In such embodiments, the total loss value may be determined by a weighted sum of the negative log-likelihood loss value 460, the second loss value 450 and the above-mentioned first loss value. It may be understood that a weight coefficient used in calculating the weighted sum may be set according to actual needs, which is not limited in the present disclosure.

According to such embodiments, a pre-trained dialogue generation model with a discrete latent variable is used as the dialogue generation model, and a random identification information is added to the input of the dialogue generation model, so that the dialogue generation model may perform multi-task learning. The output association prediction value corresponding to the identification bit may provide guidance to a certain extent. Specifically, when a recommendation information is generated using the information generation model obtained by training, it may provide guidance for whether the recommendation information may be adopted.

Figure 5:
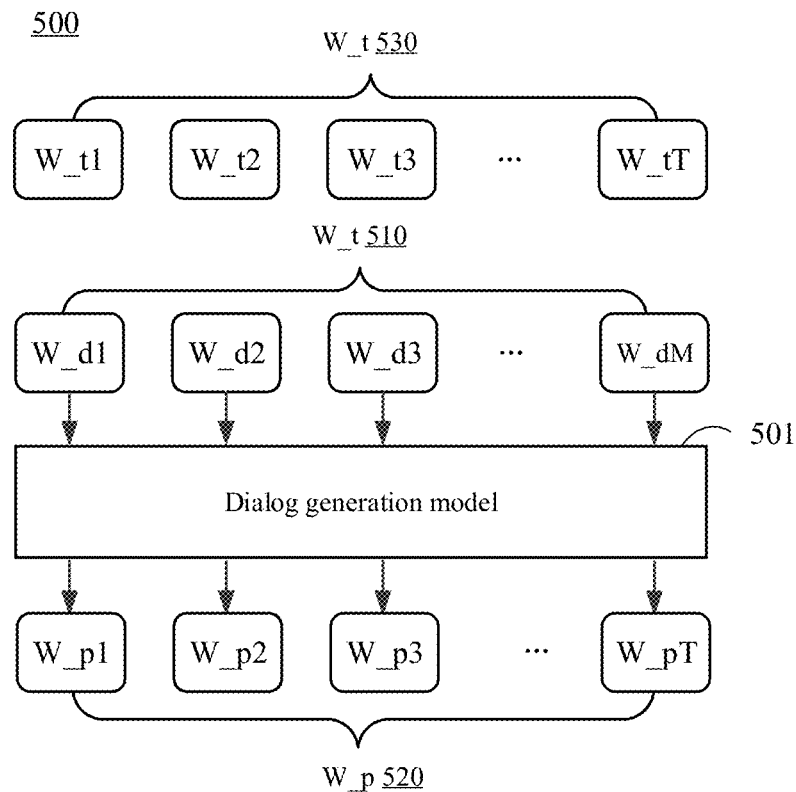
FIG. 5 shows a schematic diagram of a principle of a method of training an information generation model according to other embodiments of the present disclosure.

FIG. 5 shows a schematic diagram of a principle of a method of training an information generation model according to other embodiments of the present disclosure.

According to embodiments of the present disclosure, the dialogue generation model may also be trained with a goal that the generated recommendation information does not contain repeated words, so that the recommendation information generated by the information generation model obtained by training is more concise and smooth, which is conducive to the promotion of the target object to be recommended by the recommendation information.

In an embodiment, the second recommendation information for the target object may be determined according to the probability vector sequence using a similar method as described above. Then, it may be determined whether the plurality of obtained prediction words in the second recommendation information include repeated words. If there are repeated words, the probability vectors corresponding to the repeated words in the probability vector sequence may be determined according to a position information of the repeated words in the second recommendation information, and the probability vectors may be determined as target probability vectors. Specifically, for example, the plurality of prediction words include A, B, C, A, D in sequence, and the plurality of prediction words respectively correspond to maximum probability values included in five probability vectors in the probability vector sequence. Since a first word in the plurality of prediction words is repeated with a fourth word, a first probability vector and a fourth probability vector in the five probability vectors may be determined as the target probability vectors. Subsequently, a third loss value of the dialog generation model may be determined according to the target probability vectors. For example, the third loss value may be determined according to the maximum probability value included in any of the target probability vectors. It may be understood that the maximum probability value included in any of the probability vectors is the probability for the repeated words included in the probability vector. That is, the third loss value may also be determined according to the target probability vectors and the repeated words.

In an embodiment, the target probability vector in the probability vector sequence may also be determined according to repeated words included in the first recommendation information in the information pair. This is because a training purpose of the dialogue generation model is to make the second recommendation information consistent with the first recommendation information. The training efficiency may be improved by determining the target probability vector according to the repeated words included in the first recommendation information.

Specifically, as shown in FIG. 5, in an embodiment 500, when training the dialogue generation model 501, while a description word sequence W_d 510 is input into a dialogue generation model 501 to obtain a probability vector sequence V_p 520, the first recommendation information may be split into at least one recommendation word to obtain a recommendation word sequence W_t 530. The descriptor sequence W_d 510 may include description word W_d1 to description word W_dM, a total of M description words. The recommendation word sequence W_t 530 may include recommendation word W_d1 to recommendation word W_dT, a total of T recommendation words. The probability vector sequence V_p 520 includes probability vector V_p1 to probability vector V_pT, a total of T probability vectors.

When the recommendation word sequence W_t 530 is obtained, it may be determined whether the recommendation word sequence contains repeated words. If there are no repeated words, the third loss value is determined as 0. If there are repeated words, the probability vector corresponding to the repeated words in the probability vector sequence may be determined according to the position information of the repeated words in an actual word sequence. For example, if the recommendation word W_d1 and the recommendation word W_d3 in the actual word sequence are repeated words, the probability vectors corresponding to the repeated words in the probability vector sequence V_p 520 include the probability vector V_p1 and the probability vector V_p3, that is, the target probability vectors include the probability vector V_p1 and the probability vector V_p3. When the target probability vectors are determined, the third loss value of the dialog generation model may be determined according to the target probability vectors and the repeated words. For example, the third loss value may be determined according to the probability value for the repeated words included in any of the target probability vectors. For example, the probability vector corresponding to a later word in the repeated words may be determined as the target probability vector, and the third loss value may be determined according to the probability value for the repeated words included in the target probability vector.

According to embodiments of the present disclosure, the third loss value may be positively correlated with the probability value for the repeated words included in the target probability vector. By training the dialog generation model according to the third loss value, the probability value for the repeated words in the target probability vector may be minimized, and the probability of appearing repeated words may be reduced. It may be understood that when the second recommendation information contains more than one type of repeated words, a group of target probability vectors may be determined for each type of repeated words. One loss value may be determined according to each group of target probability vectors, and a sum of a plurality of determined loss values may be determined as the third loss value.

In an embodiment, a third loss value $L_{rep}$ may be expressed by Equation (3).

$$L_{rep} = \Sigma_{c \in C} -\log(1 - p(c|x, y_{<t})) \quad (3)$$

where, C represents a set of repeated words, c represents any repeated word in the set of repeated words, x represents an input information of the dialogue generation model, $y_{<t}$ represents an information output by the dialog generation model before outputting a $t^{th}$ probability vector (i.e., the target probability vector), and $p(c|x, y_{<t})$ represents a probability value for the repeated word c included in the target probability vector.

It may be understood that in such embodiments, the dialog generation model may also be trained by using a weighted sum of the third loss value and the above-mentioned negative log-likelihood loss value obtained by Equation (1) as the total loss value.

It may be understood in such embodiments, the total loss value may be determined according to any combination of the above-mentioned negative log-likelihood loss value and the first loss value to the third loss value, and the dialog generation model may be trained according to the total loss value.

Based on the information generation model obtained by the method of training the information generation model provided by the present disclosure, the present disclosure further provides a method of generating an information, which will be described in detail below with reference to FIG. 6.

Figure 6:
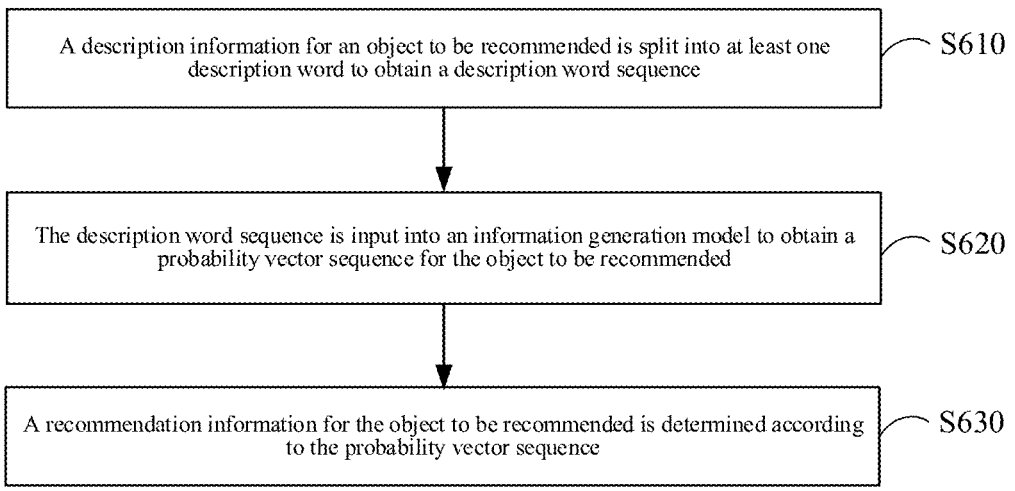
FIG. 6 shows a flowchart of a method of generating an information according to embodiments of the present disclosure.

FIG. 6 shows a flowchart of a method of generating an information according to embodiments of the present disclosure.

As shown in FIG. 6, a method 600 of generating an information in such embodiments may include operation S610 to operation S630.

In operation S610, a description information for an object to be recommended is split into at least one description word to obtain a description word sequence.

According to embodiments of the present disclosure, the object to be recommended is similar to the above-mentioned target object, and an implementation of operation S610 is similar to an implementation of operation S210 described above, which will not be repeated here.

In operation S620, the description word sequence is input into an information generation model to obtain a probability vector sequence for the object to be recommended.

Each probability vector in the probability vector sequence includes probability values for a plurality of predetermined words. The information generation model is trained using the method of training the information generation model provided in the present disclosure. An implementation of operation S620 is similar to an implementation of operation S220 described above, which will not be repeated here.

In operation S630, a recommendation information for the object to be recommended is determined according to the probability vector sequence.

According to embodiments of the present disclosure, the operation S630 may be performed by using a method similar to the method of determining the second recommendation information according to the probability vector sequence described above, which will not be repeated here.

According to embodiments of the present disclosure, the method 600 of generating the information may further include an operation of splitting a prompt information for the object to be recommended into at least one prompt word to obtain a prompt word sequence. Accordingly, the above-mentioned operation S620 may specifically include inputting the description word sequence and the prompt word sequence into the dialog generation model to obtain the probability vector sequence. An implementation principle of such embodiments is similar to a principle of obtaining the probability vector sequence in the embodiment 300 described above, which will not be repeated here.

According to embodiments of the present disclosure, the dialogue generation model may include a pre-trained dialogue generation model with a discrete latent variable. The above-mentioned operation S620 may specifically include inputting a random identification information and the description word sequence into the dialog generation model to obtain an association value corresponding to the random identification information and the probability vector sequence. The association value indicates an association relationship between the recommendation information and the description information. An implementation principle of such embodiments is similar to a principle of obtaining the association prediction value and the probability vector sequence in the embodiment 400 described above, which will not be repeated here.

It should be noted that since a model obtained by training a dialogue generation model is used in the method of generating the information provided in the present disclosure, an information with questions input into the model may be properly answered while semantically understanding the information input into the model, so that the obtained recommendation information may provide common sense knowledge, which is conducive to improving the promotion effectiveness of the object to be recommended by the recommendation information. For example, if the information input into the model includes "What's the use of skin care ingredient XXX", the obtained recommendation information may include "skin care ingredient XXX may fill wrinkles and depressions of the face, and make the skin more moisturizing", and so on.

Based on the method of training the information generation model provided by the present disclosure, the present disclosure further provides an apparatus of training an information generation model, which will be described below with reference to FIG. 7.

Figure 7:
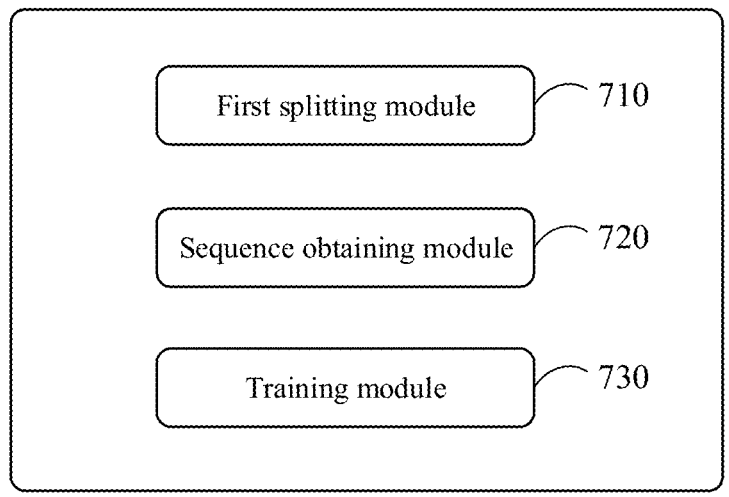
FIG. 7 shows a structural block diagram of an apparatus of training an information generation model according to embodiments of the present disclosure.

FIG. 7 shows a structural block diagram of an apparatus of training an information generation model according to embodiments of the present disclosure.

As shown in FIG. 7, an apparatus 700 of training an information generation model in such embodiments may include a first splitting module 710, a sequence obtaining module 720, and a training module 730.

The first splitting module 710 may be used to split a description information for a target object in an information pair into at least one description word, so as to obtain a description word sequence. The information pair further includes a first recommendation information. In an embodiment, the first splitting module 710 may be used to perform the operation S210 described above, which will not be described in detail here.

The sequence obtaining module 720 may be used to input the description word sequence into a dialog generation model to obtain a probability vector sequence for the target object. Each probability vector in the probability vector sequence includes probability values for a plurality of pre-determined words. In an embodiment, the sequence obtaining module 720 may be used to perform the operation S220 described above, which will not be described in detail here.

The training module 730 may be used to train the dialog generation model according to the probability vector sequence and the first recommendation information, so as to obtain the information generation model. In an embodiment, the training module 730 may be used to perform the operation S230 described above, which will not be described in detail here.

According to embodiments of the present disclosure, the apparatus 700 may further include a second splitting module used to split a prompt information for the target object into at least one prompt word, so as to obtain a prompt word sequence. The sequence obtaining module 720 may be specifically used to input the description word sequence and the prompt word sequence into the dialog generation model to obtain the probability vector sequence.

According to embodiments of the present disclosure, the probability vector sequence may indicate a second recommendation information for the target object. The apparatus 700 may further include a probability determination module and a first loss determination module. The probability determination module is used to determine, according to the probability vector sequence, a prediction probability that the second recommendation information includes the prompt information. The first loss determination module is used to determine a first loss value of the dialog generation model according to the prediction probability. The training module 730 may be further used to train the dialog generation model according to the first loss value.

According to embodiments of the present disclosure, the probability determination module may include a first determination sub-module and a second determination sub-module. The first determination sub-module is used to determine, according to a probability value in the probability vector sequence for each prompt word in the prompt word sequence, a probability that the second recommendation information contains each prompt word. The second determination sub-module is used to determine, according to at least one probability that the second recommendation information contains at least one prompt word, the prediction probability that the second recommendation information includes the prompt information.

According to embodiments of the present disclosure, the probability vector sequence indicates a second recommendation information for the target object. The apparatus 700 may further include a second loss determination module used to determine a second loss value of the dialog generation model according to an association relationship between the second recommendation information and the description information. The training module 730 may be further used to train the dialog generation model according to the second loss value.

According to embodiments of the present disclosure, the dialog generation model may include a pre-trained dialog generation model with a discrete latent variable. The sequence obtaining module 720 may be specifically used to input a random identification information and the description word sequence into the dialog generation model to obtain the probability vector sequence and an association prediction value corresponding to the random identification information. The association prediction value indicates the association relationship between the second recommendation information and the description information.

According to embodiments of the present disclosure, the apparatus 700 may further include an information determination module, a first vector determination module, and a third loss determination module. The information determination module is used to determine a second recommendation information for the target object according to the probability vector sequence. The first vector determination module is used to determine, in response to repeated words being contained in the second recommendation information, a probability vector for the repeated words in the probability vector sequence as a target probability vector according to a position information of the repeated words in the second recommendation information. The third loss determination module is used to determine a third loss value of the dialog generation model according to the target probability vector and the repeated words. The training module 730 may be further used to train the dialog generation model according to the third loss value.

According to embodiments of the present disclosure, the apparatus 700 may further include a third splitting module, a second vector determination module, and a fourth loss determination module. The third splitting module is used to split the first recommendation information into at least one recommendation word, so as to obtain a recommendation word sequence. The second vector determination module is used to determine, in response to repeated words being contained in the recommendation word sequence, a probability vector for the repeated words in the probability vector sequence as a target probability vector according to a position information of the repeated words in the recommendation word sequence. The fourth loss determination module is used to determine a third loss value of the dialog generation model according to the target probability vector and the repeated words. The training module 730 may be further used to train the dialog generation model according to the third loss value.

Figure 8:
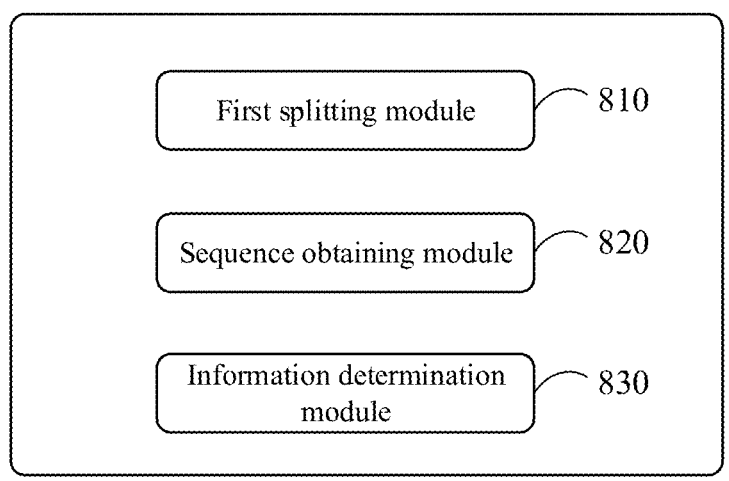
FIG. 8 shows a structural block diagram of an apparatus of generating an information according to embodiments of the present disclosure.

According to embodiments of the present disclosure, the dialogue generation model may include a pre-trained dialogue generation model with a discrete latent variable FIG. 8 shows a structural block diagram of an apparatus of generating an information according to embodiments of the present disclosure.

As shown in FIG. 8, an apparatus 800 of generating an information in such embodiments may include a first splitting module 810, a sequence obtaining module 820, and an information determination module 830.

The first splitting module 810 may be used to split a description information for an object to be recommended into at least one description word, so as to obtain a description word sequence. In an embodiment, the first splitting module 810 may be used to perform the operation S610 described above, which will not be described in detail here.

The sequence obtaining module 820 may be used to input the description word sequence into an information generation model to obtain a probability vector sequence for the object to be recommended. Each probability vector in the probability vector sequence includes probability values for a plurality of predetermined words. The information generation model may be trained using the method of training the information generation model provided by the present disclosure. In an embodiment, the sequence obtaining module 820 may be used to perform the operation S620 described above, which will not be described in detail here.

The information determination module 830 may be used to determine a recommendation information for the object to be recommended, according to the probability vector sequence. In an embodiment, the information determination module 830 may be used to perform the operation S630 described above, which will not be described in detail here.

According to embodiments of the present disclosure, the apparatus 800 may further include a second splitting module used to split a prompt information for the object to be recommended into at least one prompt word, so as to obtain a prompt word sequence. The sequence obtaining module 820 is specifically used to input the description word sequence and the prompt word sequence into the dialog generation model to obtain the probability vector sequence.

According to embodiments of the present disclosure, the dialogue generation model may include a pre-trained dialogue generation model with a discrete latent variable. The sequence obtaining module 820 may be specifically used to input a random identification information and the description word sequence into the dialog generation model to obtain the probability vector sequence and an association value corresponding to the random identification information. The association value indicates an association relationship between the recommendation information and the description information.

It should be noted that in the technical solution of the present disclosure, a collection, a storage, a use, a processing, a transmission, a provision and a disclosure of user personal information involved comply with provisions of relevant laws and regulations, and do not violate public order and good custom. In the technical solution of the present disclosure, the acquisition or collection of user personal information has been authorized or allowed by users.

According to embodiments of the present disclosure, the present disclosure further provides an electronic device, a readable storage medium, and a computer program product.

Figure 9:
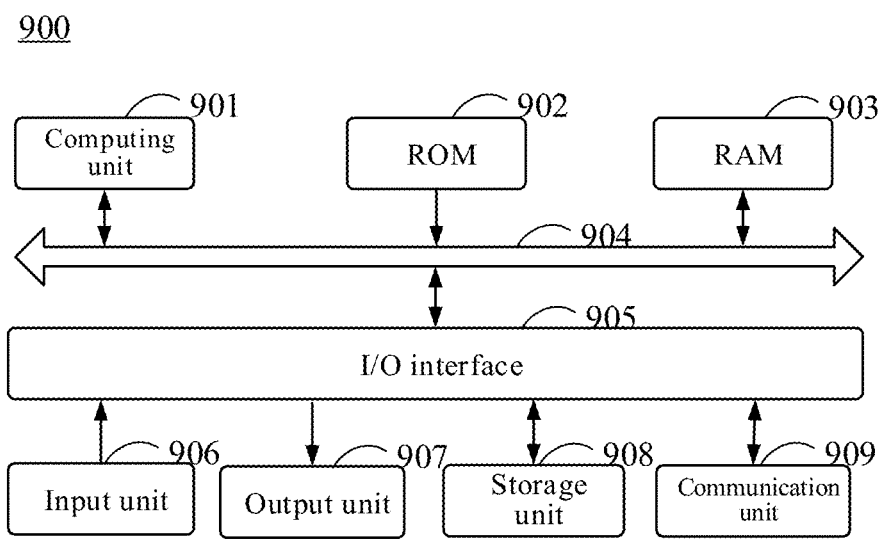
FIG. 9 shows a block diagram of an electronic device for implementing a method of training an information generation model and/or a method of generating an information according to embodiments of the present disclosure.

FIG. 9 shows a schematic block diagram of an exemplary electronic device 900 for implementing the method of training the information generation model and/or the method of generating the information provided by embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 includes a computing unit 901 which may perform various appropriate actions and processes according to a computer program stored in a read only memory (ROM) 902 or a computer program loaded from a storage unit 908 into a random access memory (RAM) 903. In the RAM 903, various programs and data necessary for an operation of the electronic device 900 may also be stored. The computing unit 901, the ROM 902 and the RAM 903 are connected to each other through a bus 904. An input/output (I/O) interface 905 is also connected to the bus 904.

A plurality of components in the electronic device 900 are connected to the I/O interface 905, including: an input unit 906, such as a keyboard, or a mouse; an output unit 907, such as displays or speakers of various types; a storage unit 908, such as a disk, or an optical disc; and a communication unit 909, such as a network card, a modem, or a wireless communication transceiver. The communication unit 909 allows the electronic device 900 to exchange information/ data with other devices through a computer network such as Internet and/or various telecommunication networks.

The computing unit 901 may be various general-purpose and/or dedicated processing assemblies having processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and processes described above, such as the method of training the information generation model and/or the method of generating the information. For example, in some embodiments, the method of training the information generation model and/or the method of generating the information may be implemented as a computer software program which is tangibly embodied in a machine-readable medium, such as the storage unit 908. In some embodiments, the computer program may be partially or entirely loaded and/or installed in the electronic device 900 via the ROM 902 and/or the communication unit 909. The computer program, when loaded in the RAM 903 and executed by the computing unit 901, may execute one or more steps in the method of training the information generation model and/or the method of generating the information. Alternatively, in other embodiments, the computing unit 901 may be used to perform the method of training the information generation model and/or the method of generating the information by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host, which is a host product in a cloud computing service system to solve shortcomings of difficult management and weak business scalability existing in an existing physical host and VPS (Virtual Private Server) service. The server may also be a server of a distributed system or a server combined with a block-chain.

It should be understood that steps of the processes illustrated above may be reordered, added or deleted in various manners. For example, the steps described in the present disclosure may be performed in parallel, in sequence, or in a different order, as long as a desired result for the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training an information generation model that is implemented by a processor, the method comprising:
splitting a description information for a target object associated with a product to be promoted in an information pair into at least one description word, so as to obtain a description word sequence, wherein the information pair further comprises a first recommendation information;
inputting the description word sequence into a dialog generation model configured to generate diverse and contextually relevant recommendation information to obtain a probability vector sequence for the target object, wherein each probability vector in the probability vector sequence comprises probability values for a plurality of predetermined words; and
training the dialog generation model according to the probability vector sequence and the first recommendation information, to generate recommendation information exhibiting diversity and contextual alignment with the description information, as enabled by the discrete latent variable and multi-task learning configuration of the dialog generation model, so as to obtain the information generation model,
wherein the probability vector sequence indicates a second recommendation information for the target object;
wherein the training the dialog generation model according to the probability vector sequence and the first recommendation information comprises:
determining, according to the probability vector sequence, a prediction probability that the second recommendation information comprises a prompt information;
determining a first loss value of the dialog generation model according to the prediction probability;
determining a second loss value of the dialog generation model according to an association relationship between the second recommendation information and the description information; and
training the dialog generation model according to the first loss value, the second loss value, and the first recommendation information,
wherein the dialog generation model comprises a pre-trained dialog generation model with a discrete latent variable;
wherein the inputting the description word sequence into the dialog generation model to obtain the probability vector sequence for the target object comprises: inputting a random identification information and the description word sequence into the dialog generation model to enable multi-task learning by jointly training for association prediction and text generation tasks, so as to obtain the probability vector sequence and an association prediction value corresponding to the random identification information, and
wherein the association prediction value indicates the association relationship between the second recommendation information and the description information,
wherein the generated recommendation information is configured for presentation to a user via a human-computer interaction interface or used for display in connection with the promoted item.

2. The method according to claim 1, further comprising:
splitting the prompt information for the target object into at least one prompt word, so as to obtain a prompt word sequence;
wherein the inputting the description word sequence into a dialog generation model to obtain a probability vector sequence for the target object further comprises: inputting the description word sequence and the prompt word sequence into the dialog generation model to obtain the probability vector sequence.

3. The method according to claim 1, wherein the determining, according to the probability vector sequence, the prediction probability that the second recommendation information comprises the prompt information comprises:
determining, according to a probability value in the probability vector sequence for each prompt word in the prompt word sequence, a probability that the second recommendation information contains each prompt word; and
determining, according to at least one probability that the second recommendation information contains at least one prompt word, the prediction probability that the second recommendation information comprises the prompt information.

4. The method according to claim 1, further comprising:
determining, in response to repeated words being contained in the second recommendation information, a probability vector for the repeated words in the probability vector sequence as a target probability vector according to a position information of the repeated words in the second recommendation information; and
determining a third loss value of the dialog generation model according to the target probability vector and the repeated words;
wherein the training the dialog generation model according to the probability vector sequence and the first recommendation information further comprises: training the dialog generation model according to the first loss value, the second loss value, and the third loss value.

5. The method according to claim 1, further comprising:
splitting the first recommendation information into at least one recommendation word, so as to obtain a recommendation word sequence;
determining, in response to repeated words being contained in the recommendation word sequence, a probability vector for the repeated words in the probability vector sequence as a target probability vector according to a position information of the repeated words in the recommendation word sequence; and
determining a third loss value of the dialog generation model according to the target probability vector and the repeated words;
wherein the training the dialog generation model according to the probability vector sequence and the first recommendation information further comprises: training the dialog generation model according to the first loss value, the second loss value, and the third loss value.

6. A method of generating an information that is implemented by a processor, the method comprising:
splitting a description information for an object to be recommended into at least one description word, so as to obtain a description word sequence;
inputting the description word sequence into an information generation model to obtain a probability vector sequence for the object to be recommended, wherein each probability vector in the probability vector sequence comprises probability values for a plurality of predetermined words; and determining a recommendation information for the object to be recommended, according to the probability vector sequence, wherein the information generation model is trained using a method of training an information generation model, comprising:

splitting a description information for a target object associated with a product to be promoted in an information pair into at least one description word, so as to obtain a description word sequence, wherein the information pair further comprises a first recommendation information;

inputting the description word sequence into a dialog generation model configured to generate diverse and contextually relevant recommendation information to obtain a probability vector sequence for the target object, wherein each probability vector in the probability vector sequence comprises probability values for a plurality of predetermined words; and training the dialog generation model according to the probability vector sequence and the first recommendation information, to generate recommendation information exhibiting diversity and contextual alignment with the description information, as enabled by the discrete latent variable and multi-task learning configuration of the dialog generation model, so as to obtain the information generation model, wherein the probability vector sequence indicates a second recommendation information for the target object;

wherein the training the dialog generation model according to the probability vector sequence and the first recommendation information comprises:

determining, according to the probability vector sequence, a prediction probability that the second recommendation information comprises a prompt information;

determining a first loss value of the dialog generation model according to the prediction probability;

determining a second loss value of the dialog generation model according to an association relationship between the second recommendation information and the description information; and training the dialog generation model according to the first loss value, the second loss value, and the first recommendation information, wherein the dialog generation model comprises a pre-trained dialog generation model with a discrete latent variable;

wherein the inputting the description word sequence into the dialog generation model to obtain the probability vector sequence for the target object comprises: inputting a random identification information and the description word sequence into the dialog generation model to enable multi-task learning by jointly training for association prediction and text generation tasks, so as to obtain the probability vector sequence and an association prediction value corresponding to the random identification information, and wherein the association prediction value indicates the association relationship between the second recommendation information and the description information, wherein the generated recommendation information is configured for presentation to a user via a human-computer interaction interface or used for display in connection with the promoted item.

7. The method according to claim 6, further comprising:

splitting a prompt information for the object to be recommended into at least one prompt word, so as to obtain a prompt word sequence;

wherein the inputting the description word sequence into an information generation model to obtain a probability vector sequence for the object to be recommended further comprises: inputting the description word sequence and the prompt word sequence into the dialog generation model to obtain the probability vector sequence.

8. An electronic device, comprising:

at least one processor; and a memory communicatively connected to the at least one processor, wherein the memory stores instructions executable by the at least one processor, and the instructions, when executed by the at least one processor, cause the at least one processor to implement a method of training an information generation model, comprising operations of:

splitting a description information for a target object associated with a product to be promoted in an information pair into at least one description word, so as to obtain a description word sequence, wherein the information pair further comprises a first recommendation information;

inputting the description word sequence into a dialog generation model configured to generate diverse and contextually relevant recommendation information to obtain a probability vector sequence for the target object, wherein each probability vector in the probability vector sequence comprises probability values for a plurality of predetermined words; and training the dialog generation model according to the probability vector sequence and the first recommendation information, to generate recommendation information exhibiting diversity and contextual alignment with the description information, as enabled by the discrete latent variable and multi-task learning configuration of the dialog generation model, so as to obtain the information generation model, wherein the probability vector sequence indicates a second recommendation information for the target object;

wherein the training the dialog generation model according to the probability vector sequence and the first recommendation information comprises:

determining, according to the probability vector sequence, a prediction probability that the second recommendation information comprises a prompt information;

determining a first loss value of the dialog generation model according to the prediction probability;

determining a second loss value of the dialog generation model according to an association relationship between the second recommendation information and the description information; and training the dialog generation model according to the first loss value, the second loss value, and the first recommendation information, wherein the dialog generation model comprises a pre-trained dialog generation model with a discrete latent variable;

wherein the inputting the description word sequence into the dialog generation model to obtain the probability vector sequence for the target object comprises: inputting a random identification information and the description word sequence into the dialog generation model to enable multi-task learning by jointly training for association prediction and text generation tasks, to obtain the probability vector sequence and an association prediction value corresponding to the random identification information, and wherein the association prediction value indicates the association relationship between the second recommendation information and the description information, wherein the generated recommendation information is configured for presentation to a user via a human-computer interaction interface or used for display in connection with the promoted item.

9. The electronic device according to claim 8, wherein the instructions, when executed by the at least one processor, cause the at least one processor to implement operations of:
splitting the prompt information for the target object into at least one prompt word, so as to obtain a prompt word sequence; and
inputting the description word sequence and the prompt word sequence into the dialog generation model to obtain the probability vector sequence.

10. An electronic device, comprising:
at least one processor; and
a memory communicatively connected to the at least one processor, wherein the memory stores instructions executable by the at least one processor, and the instructions, when executed by the at least one processor, cause the at least one processor to implement the method of claim 6.

11. The electronic device according to claim 10, wherein the instructions, when executed by the at least one processor, cause the at least one processor to implement operations of:
splitting a prompt information for the object to be recommended into at least one prompt word, so as to obtain a prompt word sequence; and
inputting the description word sequence and the prompt word sequence into the dialog generation model to obtain the probability vector sequence.

12. A non-transitory computer-readable storage medium having computer instructions therein, wherein the computer instructions are configured to cause a computer to implement the method according to claim 1.

13. A non-transitory computer-readable storage medium having computer instructions therein, wherein the computer instructions are configured to cause a computer to implement the method according to claim 6.

* * * * *